(12) United States Patent  
Gemba et al.

(10) Patent No.: US 11,821,843 B2  
(45) Date of Patent: Nov. 21, 2023

(54) ELECTRONIC COMPONENT INSPECTION APPARATUS AND ELECTRONIC COMPONENT INSPECTION METHOD

(71) Applicant: SUMIDA CORPORATION, Tokyo (JP)

(72) Inventors: Daichi Gemba, Natori (JP); Junji Morita, Natori (JP)

(73) Assignee: SUMIDA CORPORATION

( * ) Notice: Subject to any disclaimer, the term of this patent is extended or adjusted under 35 U.S.C. 154(b) by 168 days.

(21) Appl. No.: 17/343,879

(22) Filed: Jun. 10, 2021

(65) Prior Publication Data

US 2021/0396682 A1 Dec. 23, 2021

(30) Foreign Application Priority Data

Jun. 19, 2020 (JP) ................................ 2020-105843

(51) Int. Cl.
  *H04N 5/225* (2006.01)
  *G01N 21/88* (2006.01)
  *G02B 26/08* (2006.01)
  *H04N 23/56* (2023.01)

(52) U.S. Cl.
  CPC ..... *G01N 21/8806* (2013.01); *G02B 26/0816* (2013.01); *H04N 23/56* (2023.01); *G01N 2201/0636* (2013.01)

(58) Field of Classification Search
  CPC . G01N 21/8806; H04N 23/56; G02B 26/0816
  See application file for complete search history.

(56) References Cited

U.S. PATENT DOCUMENTS

| 4,803,871 A * | 2/1989 | Harada | H05K 13/0813 |
| | | | 73/104 |
| 6,727,713 B1 * | 4/2004 | Choi | G01N 21/8806 |
| | | | 356/237.5 |
| 2002/0085199 A1 * | 7/2002 | Shires | G01N 21/8806 |
| | | | 356/237.1 |

(Continued)

FOREIGN PATENT DOCUMENTS

| EP | 0425722 A1 | 5/1991 |
| JP | H10-288508 A | 10/1998 |
| WO | 0244651 A1 | 6/2002 |

OTHER PUBLICATIONS

European Search Report issued for the corresponding European Application No. 21180064.4; dated Nov. 12, 2021 (total 7 pages).

*Primary Examiner* — Jonathan R Messmore

(74) *Attorney, Agent, or Firm* — Harness, Dickey & Pierce, P.L.C.

(57) ABSTRACT

An electronic component inspection apparatus includes: a holding unit that holds an electronic component having a component body and terminals; light sources and reflection plates that irradiate reflected light at least on the terminals of the electronic component held by the holding unit, from the side of a back face opposite to a mounting face of the electronic component; a camera that captures an image of the electronic component under irradiation of the reflected light, from the side of the mounting face; and a control unit that controls processing related to inspection of the electronic component, on the basis of the image of the electronic component captured by the camera.

9 Claims, 8 Drawing Sheets

(56) References Cited

U.S. PATENT DOCUMENTS

2003/0174318 A1* 9/2003 Quist ................. G01N 21/8806
356/237.1
2006/0144158 A1* 7/2006 Hartmann ............ G01B 11/245
73/761

* cited by examiner

ELECTRONIC COMPONENT INSPECTION APPARATUS AND ELECTRONIC COMPONENT INSPECTION METHOD

CROSS REFERENCE TO RELATED APPLICATIONS

This application is based on Japanese Patent Application No. 2020-105843, filed on Jun. 19, 2020 in the Japanese Patent Office, the entire content of which is incorporated hereinto by reference.

BACKGROUND OF THE INVENTION

1. Field of the Invention

The present disclosure relates to an electronic component inspection apparatus and an electronic component inspection method.

2. Description of the Related Art

Pre-shipment inspection of manufactured electronic component is a usual practice at manufacturing sites of electronic component. Known apparatus for inspecting electronic component is exemplified by an appearance inspection apparatus described in JP-H10-288508A. The apparatus described in JP-H10-288508A has an integrated structure of a two-dimensional image lighting unit, a camera for capturing a two-dimensional image illuminated by the two-dimensional image lighting unit, a laser irradiation unit that irradiates laser light on an object, and a laser spot receiving position detector that receives laser light reflected on the object to determine change of height level of the object, thereby enabling acquisition of a two-dimensional image and a three-dimensional height information at a time.

Technical Problem

Inspection of electronic component include inspection of mounting failure. The mounting failure is judged on the basis of inclination (flatness) of a component body when mounted on a board. The flatness of the electronic component is detected by measuring height of a terminal that extends out from the component body of the electronic component, that is, the height of terminal with reference to the component body. The more precisely the height of terminal is measured, the more precisely the mounting failure is detectable.

The height of terminal is determined on an image of the terminal captured with a camera. Hence, a possible way to detect the height of terminal may be such as applying the appearance inspection apparatus described in JP-H10-288508A, and obtaining information regarding the height of terminal from the two-dimensional image.

In a case of detecting the height of terminal which extends out from the bottom face of body of the electronic component, an effort for obtaining a sharp image by irradiating light from the side of a mounting face of the terminal, as described in JP-H10-288508A, has however caused scattering of the irradiated light at an edge on the surface of the terminal, and has often resulted in a less sharp edge seen on the image. This would make it difficult to specify a point to be inspected (inspection point), and would consequently degrade accuracy of determination of flatness.

SUMMARY OF THE INVENTION

The present disclosure, conceived considering the aforementioned problem, is to provide an electronic component inspection apparatus and an inspection method capable of accurately specifying an inspection point on the terminal of the electronic component.

An electronic component inspection apparatus of the present disclosure includes:
- a holding unit that holds an electronic component having a component body and a terminal;
- a photo-irradiation unit that irradiates light at least on the terminal of the electronic component held by the holding unit, from the side of a back face opposite to a mounting face of the electronic component;
- an image capture unit that captures an image of the electronic component under irradiation of the light, from the side of the mounting face; and
- a control unit that controls processing related to inspection of the electronic component, on the basis of the image of the electronic component captured by the image capture unit.

An electronic component inspection method of the present disclosure include:
- irradiating light on at least a terminal of an electronic component that has a component body and the terminal, from the side of a back face opposite to a mounting face of the electronic component;
- capturing an image of the electronic component under irradiation of light, from the side of the mounting face; and
- controlling processing related to inspection of the electronic component, on the basis of the captured image of the electronic component.

Advantageous Effects of Invention

The present disclosure can provide an electronic component inspection apparatus and an electronic component inspection method that can accurately specify an inspection point on a terminal of an electronic component.

BRIEF DESCRIPTION OF THE DRAWINGS

FIGS. 6A and 6B are drawings illustrating an electronic component inspection apparatus of a second embodiment, wherein FIG. 6A illustrates a reflective plate during transfer of the electronic component, and FIG. 6B illustrates the reflective plate during image capture of the electronic component;

FIGS. 7A and 7B are drawings illustrating a variation 1 of the second embodiment, wherein FIG. 7A illustrates a position of the reflective plate during image capture, and FIG. 7B illustrates a position of the reflective plate shifted apart from the image capture area after image capture.

DETAILED DESCRIPTION OF THE PREFERRED EMBODIMENTS

[Overview]

Figure 1:
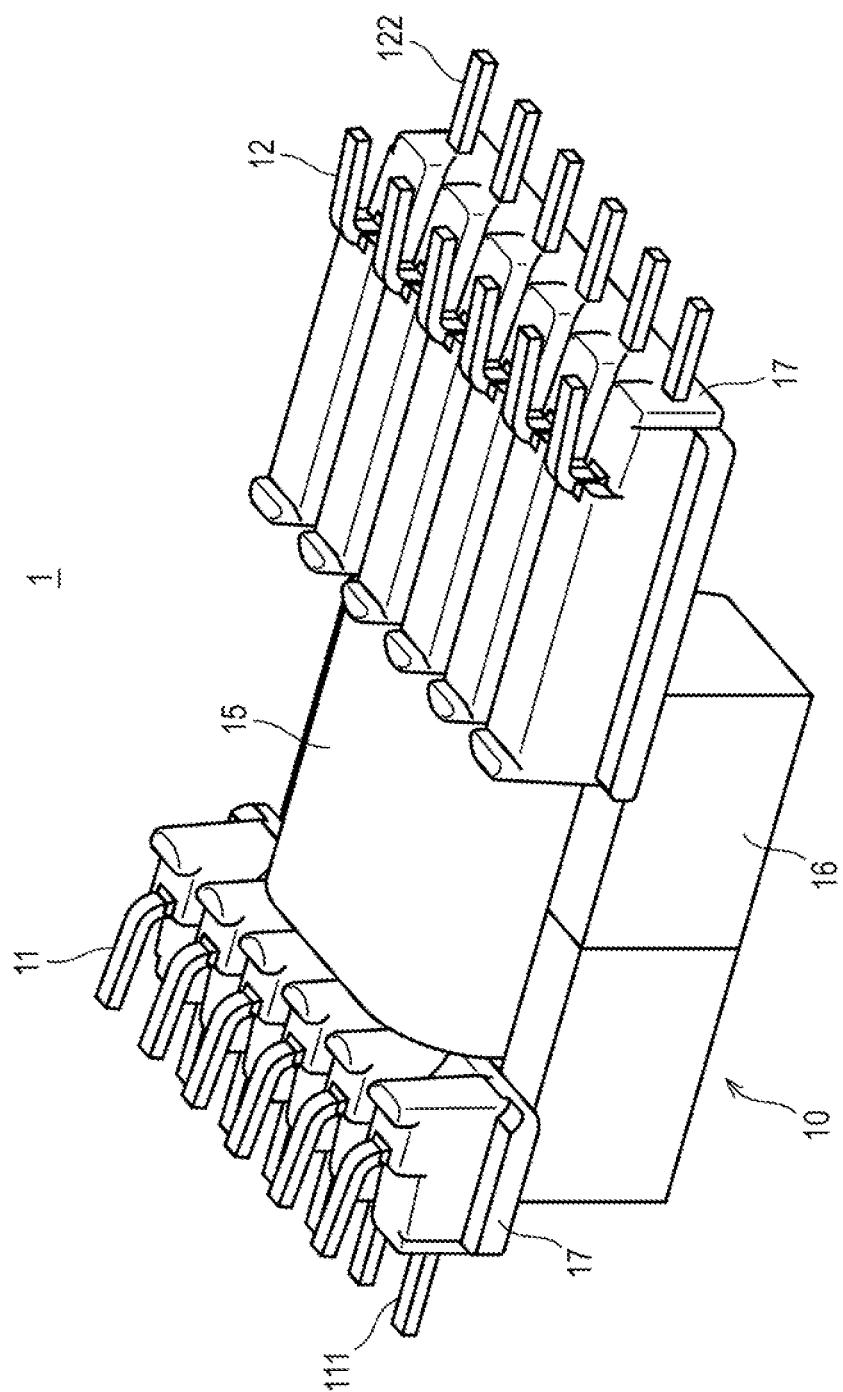
FIG. 1 is a perspective view illustrating an electronic component to be inspected by using an electronic component inspection apparatus of the present disclosure.

Prior to explanation of embodiments of the present disclosure, a first embodiment and a second embodiment of the present disclosure (also collectively referred to as "the present embodiments", hereinafter) will be outlined. FIG. 1 is a perspective view illustrating an electronic component 1 to be inspected by using an electronic component inspection apparatus of the present embodiments, in which the electronic component 1 is viewed from the side facing to the mounting face. Note now that the "mounting face" in the context of this patent specification is a virtual plane assumed when the electronic component 1 is mounted.

Figure 2A:
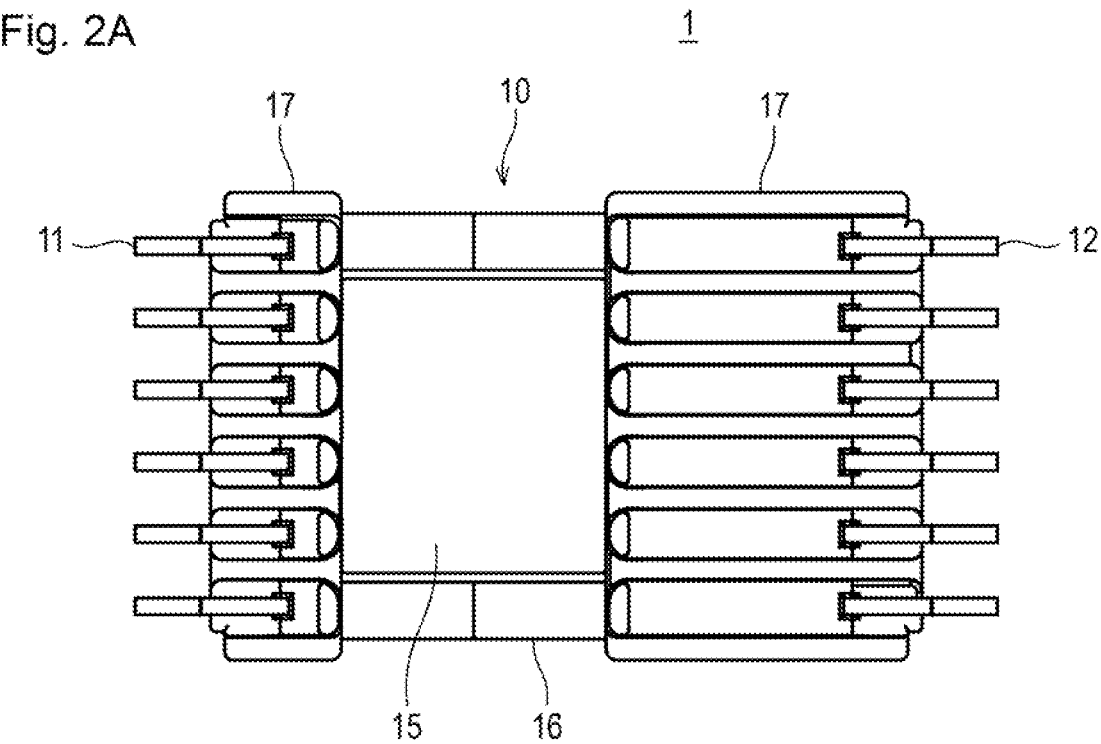
FIG. 2A is a bottom view of the electronic component illustrated in FIG. 1.
Figure 2B:
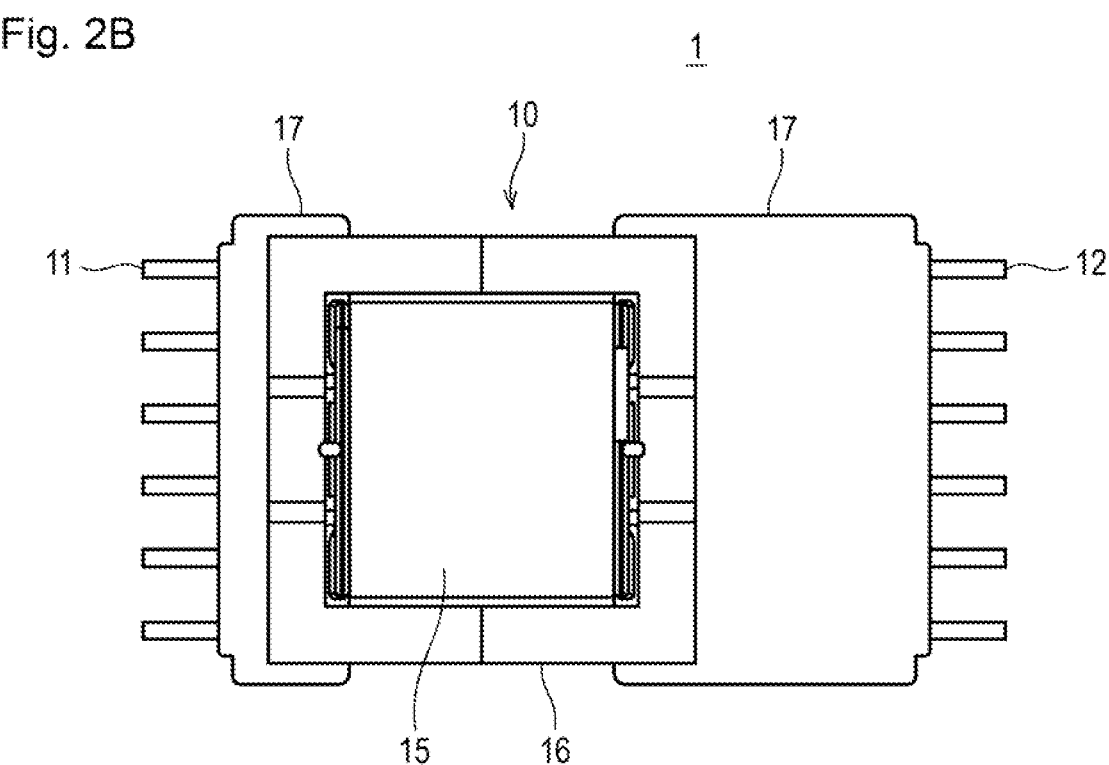
FIG. 2B is a top view.

FIGS. 2A and 2B are drawings illustrating the top face and the bottom face (the bottom face will also be denoted as "terminal face", hereinafter), wherein FIG. 2A is a bottom view of the electronic component 1, and FIG. 2B is a top view of the electronic component 1. The electronic component 1 has a component body 10 and terminals 11, 12. Note that terminals 111, 122 that extend from the component body 10 are entwined terminals, and are not constituents of the mounting terminal.

The component body 10 has a bobbin (not illustrated) with a wound part (not illustrated) around which a coil 15 is wound on the outer circumference thereof, a base 16 that houses the bobbin, and outside legs 17 that partially house the terminals 11, 12 and partially allow them to expose. The terminals 11, 12 are mounting terminals that are electrically connected respectively with the terminals 111, 122 to which coil ends (not illustrated) of the coil 15 are entwinned, and are mounted on an unillustrated mounting board. These plurality of terminals 11, 12 are held in parallel to each other by the base 16.

In the present disclosure, a face which is directed opposite to the mounting face when the electronic component 1 is mounted will be denoted as a "back face". That is, the back face in the context of the present embodiments is determined with reference to the mounting face. The back face is identical to the top face of the electronic component 1.

The terminals 11, 12 are lead terminals that extend from the component body 10 in mutually opposite directions. In the present embodiments, the terminal that extends from the base 16 leftwards in FIGS. 2A and 2B is referred to as the terminal 11, and the terminal that extends rightwards is referred to as the terminal 12 for convenience. Note, however, that the present embodiments are not limited to inspection of the lead terminals, and instead are also applicable to any types of electronic component in which a part of the component body 10 and parts of the terminals 11, 12 form an overlapping area when viewed from the side of the mounting face.

First Embodiment

When using the electronic component inspection apparatus of the first embodiment, the light is irradiated on the electronic component 1 from the side of the back face, to acquire a two-dimensional image of the back face. Contour shapes of the terminals 11, 12 are then detected from the thus obtained two-dimensional image, and points (ordinates) on the terminals 11, 12 are detected referring to edges of the terminals 11, 12 determined on the basis of the contour shapes. Processing is then carried out to correlate the thus detected points with predetermined inspection points.

In the processing, the irradiation light irradiated on the back face of the terminals 11, 12 would occasionally not reach the terminals 11, 12 while shadowed by the component body 10. Aiming at solving this problem, the first embodiment is devised to insert a reflective plate into an overlapping areas of each of the terminals 11, 12 and the component body 10 when viewed from the side of the mounting face, so as to allow the irradiation light to reflect thereon, to thereby capture an image (referred to as "backlit image", hereinafter) showing sharp edges of the terminals 11, 12.

[Electronic Component Inspection Apparatus]

The first embodiment of the present disclosure will be explained below, referring to the drawings. Note that the drawings are merely illustrative ones for explaining structures, arrangements and functions of an exemplary electronic component inspection apparatus of the first embodiment, without limiting specific shapes and other features. In all drawings, all similar components are given the same reference signs, for the convenience of occasionally skipping a part of explanations.

Figure 3:
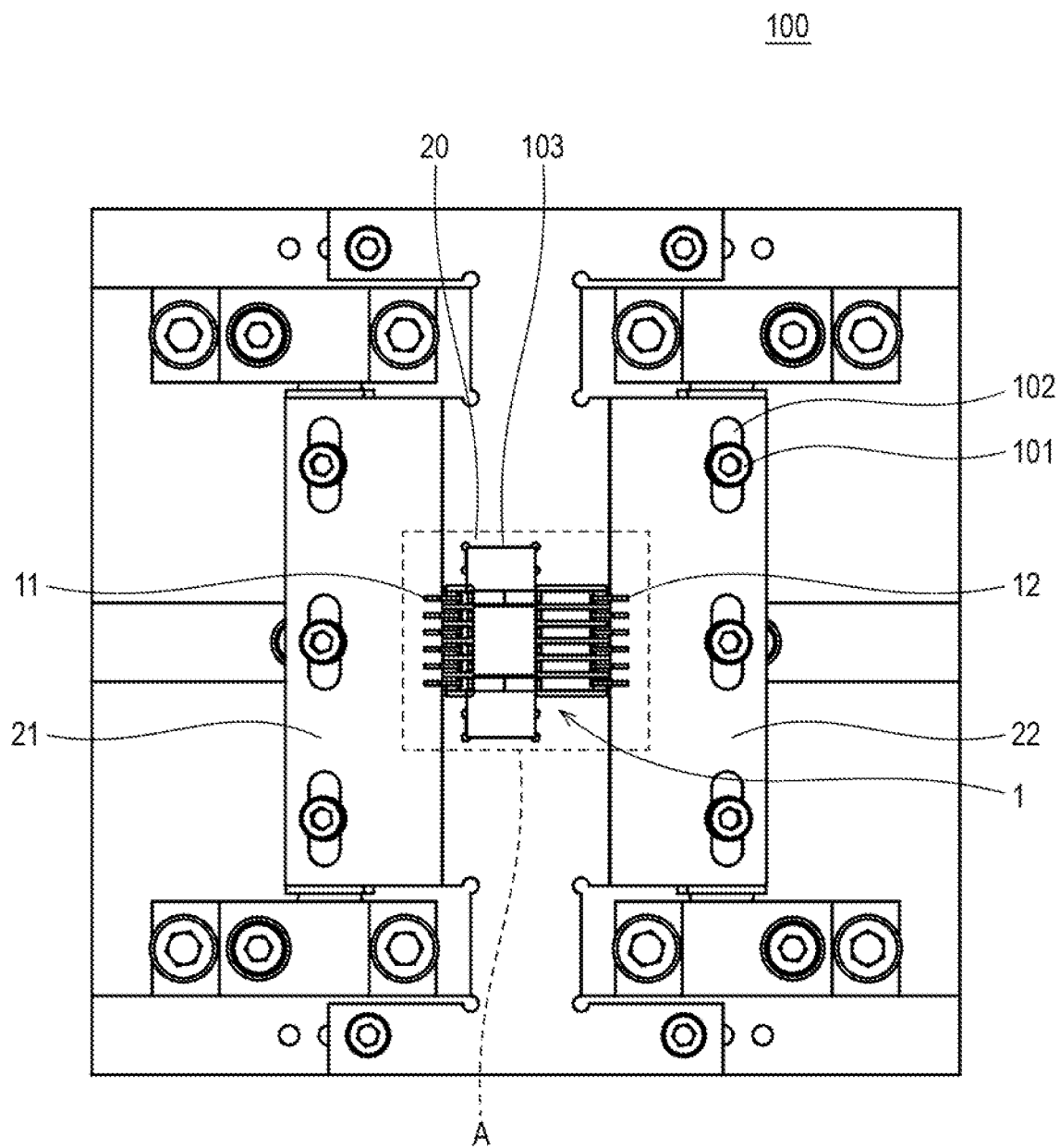
FIG. 3 is a top view illustrating an electronic component inspection apparatus of a first embodiment.

FIG. 3 is a drawing explaining an electronic component inspection apparatus of the first embodiment (also simply referred to as "inspection apparatus", hereinafter), and is a top view of an inspection apparatus 100. The inspection apparatus 100 has a holder 20 that holds and fixes the electronic component 1. FIG. 3 is a drawing of the inspection apparatus 100 viewed from the side of the mounting face of the electronic component 1.

The inspection apparatus 100 of the first embodiment has a pair of reflective plates 21, 22 arranged while placing in between an image capture area A in which the electronic component 1 is shot. The image capture area A corresponds to a zone shot by a camera 25 illustrated in FIG. 4. The electronic component 1, when shot, is held and fixed so that the terminal face confronts the camera 25 and falls within the image capture area A. The reflective plates 21, 22 are arranged one by one laterally on both sides of the image capture area A, each of which being inserted into an area where the component body 10 overlaps with the terminal 11 or with the terminal 12. The reflective plates 21, 22 have the ends thereof slightly declined towards the virtual mounting plane assumed when the electronic component 1 is mounted. Tilt of the reflective plates will be described later referring to FIG. 4 and other drawings.

The reflective plates 21, 22 have formed therein long holes 102, and are fixed to an unillustrated base with use of bolts 101 inserted in the long holes 102. The inspection apparatus 100 further has a transfer unit that transfers the electronic component 1. The transfer unit may have any structure not specifically limited, by which the electronic component 1 may be loaded typically with use of a robot arm into the image capture area A from the front of the sheet of FIG. 3, or may alternatively be transferred in the vertical direction of FIG. 3 typically with use of a belt conveyor, so as to move sequentially into the image capture area A, and then leave the image capture area A after shot.

The holder 20 holds the terminals 11, 12 in midair, so as to enable the irradiation light coming from the lower side of the terminals 11, 12 to illuminate at least the terminals 11, 12 of the electronic component 1.

Figure 4:
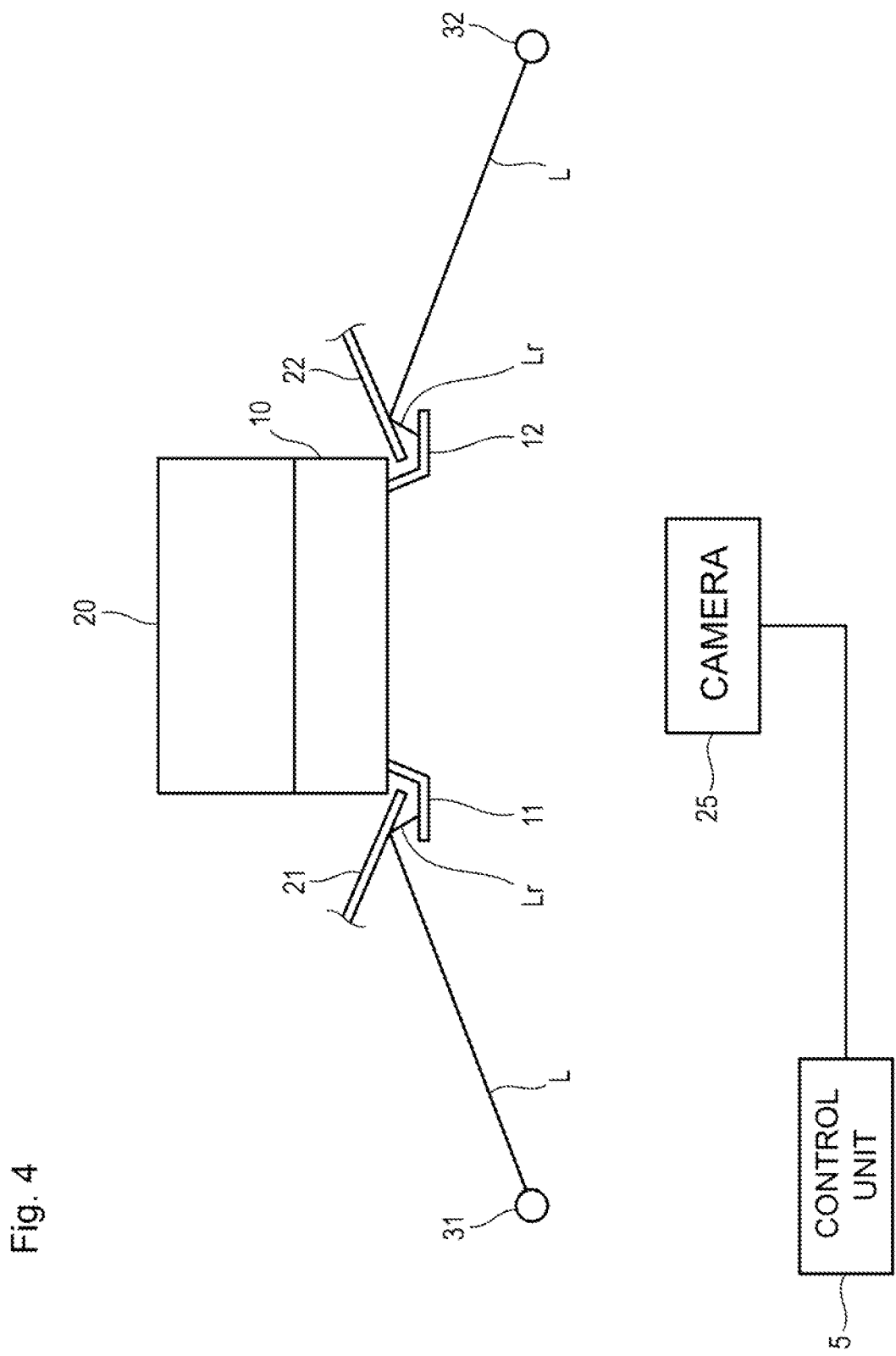
FIG. 4 is a schematic drawing illustrating the electronic component inspection apparatus of the first embodiment.

FIG. 4 is a schematic drawing for explaining the inspection apparatus of the first embodiment. As illustrated in FIG. 4, the inspection apparatus has the holder that holds the electronic component 1 having the terminals 11, 12 at a predetermined position; and a photo-irradiation unit that irradiates reflected light Lr at least onto the terminals 11, 12 of the electronic component 1 held by the holder 20, from the back face. The photo-irradiation unit in the first embodiment has light sources 31, 32 and the reflective plates 21, 22. A part of irradiation light L emitted from the light sources 31, 32 is reflected on the reflective plates 21, 22, and irradiated as the reflected light Lr onto the terminals 11, 12 from the back face.

The structure illustrated in FIG. 4 also has the camera 25, which is an image capture unit that captures an image of the electronic component 1 being irradiated by the irradiation light L and the reflected light Lr with use of the light sources 31, 32 and the reflective plates 21, 22; and a control unit 5 that controls processing related to inspection of the electronic component 1, on the basis of the image of the electronic component 1 captured by the camera 25. The reflected light Lr is given as backlight for shooting the terminals 11, 12, when viewed from the camera 25.

Note that the first embodiment, although illustrated in FIG. 4 as an exemplary case having the light sources 31, 32 and the camera 25 arranged below the electronic component 1, is not limited to such structure. The first embodiment may alternatively be devised to set the electronic component 1 with the terminal face directed upward, and to arrange the light sources 31, 32 and the camera 25 above the electronic component 1 so as to shoot the terminal face.

With the irradiation light L irradiated on the terminal face of the electronic component 1, the first embodiment can brighten the terminal face, and can obtain a sharp image of the terminals 11, 12. Such case would, however, make the light scattered on the edges of the terminals, occasionally making the edge contour less discriminable on the image. In addition, the irradiation light L would be shadowed by the component body 10, so as to make the area where the terminals 11, 12 and the component body 10 overlap less recognizable on the image. The present inventors of the present disclosure presupposed that the level of height of the terminals 11, 12 is measured at a plurality of inspection points, so that the aforementioned situation would fail in achieving accuracy sufficient for determining the measuring points of the height level of the terminals 11, 12.

Aimed at solving this problem, the first embodiment is devised to compose the photo-irradiation unit by using the light sources 31, 32 that irradiate irradiation light L onto the electronic component; and the reflective plates 21, 22 which serve as a reflector on which the irradiation light L emitted from the light sources 31, 32 is reflect towards the terminals 11, 12, as described above. The light sources 31, 32 are freely selectable for example from known types of lamp and light emitting diode (LED). The reflective plates 21, 22 are preferably made of a highly reflective material, such as aluminum, stainless steel and other metals. A part of the irradiation light L directed towards the terminals 11, 12 is converted to the reflected light Lr on the reflective plates 21, 22, and then irradiated on the terminals 11, 12 from the back face.

As described previously, the electronic component 1 in the first embodiment has the lead terminals that extend out from the component body 10. A part of the lead terminals and a part of the component body 10 are arranged apart from each other, and form an overlapping area when viewed from the side of the mounting face. The reflective plates 21, 22 are inserted in the overlapping area at a level of height between those of the component body 10 and the terminals 11, 12. Each of the terminals 11, 12 protrudes downwards from the component body 10, and further outwards again from the component body 10. In the exemplary case illustrated in FIG. 4, downwardly protruded sections and outwardly protruded sections of the terminals 11, 12 form the overlapping area with the component body 10.

In the exemplary case illustrated in FIG. 4, the reflective plates 21, 22 are inserted so as to respectively aim at kinks between the downwardly protruded sections and the outwardly protruded sections of the terminals 11, 12. The reflective plates 21, 22 in this setting are inclined downwards to the mounting face of the electronic component 1. The reflective plates 21, 22 are, however, not always necessarily be angled in this way, instead may be nearly in parallel with the mounting face, or may be inclined upwards from the mounting face. Angles of the reflective plates 21, 22 are suitably determined so as to enhance intensity of the reflected light at a desired position, typically depending on distance between the component body 10 and the terminals 11, 12, depth of the overlapping area, and position of the inspection points.

Positions and distances of the light sources 31, 32 are suitably determined so that the irradiation light can be incident on the reflective plates 21, 22, and can give a sufficient amount of reflected light Lr to be incident on a desired position on the back face of the terminals 11, 12.

Figure 5:
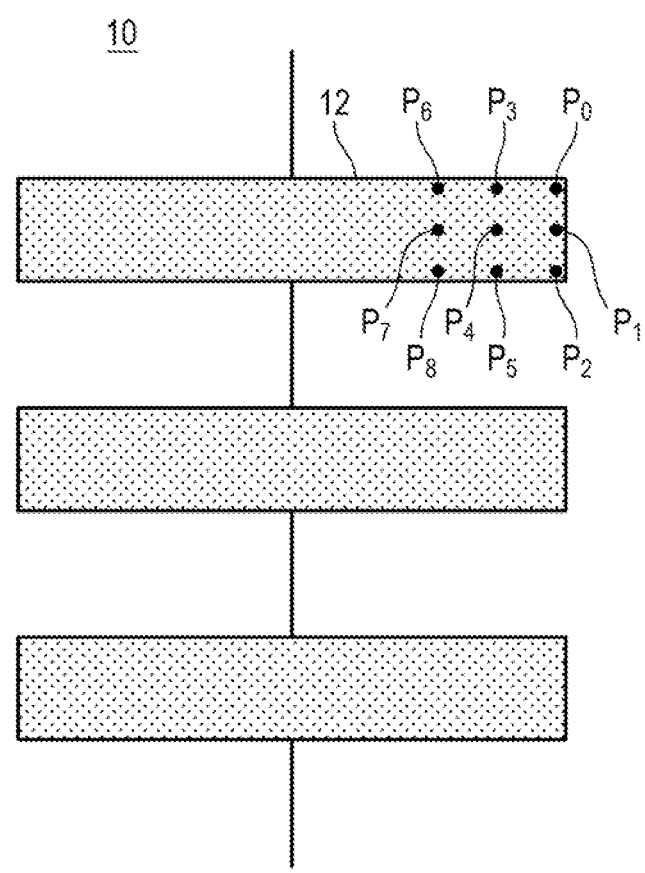
FIG. 5 is a schematic drawing illustrating a captured image of a terminal.

The camera 25 shoots a range that covers the terminals 11, 12 from the lower side of the electronic component 1. FIG. 5 is a schematic drawing for explaining a captured image of the terminal 12. With the reflected light Lr reflected on the reflective plate 22 and irradiated on the terminal 12 from the back face, the terminal 12 looks dark on the image, while the periphery of the terminal 12 looks bright. On such image, brightness at the boundary between the terminal 12 and the background largely changes, sharply depicting the edge of the terminal 12.

The control unit 5 acquires data of the image (image data) shot by the camera 25. On the basis of the image of the electronic component 1, the control unit 5 detects contour shapes of at least the terminals 11, 12. As descried previously, the image shot by the camera 25 is a backlit image in which brightness changes largely between the terminals 11, 12 and the background, making it easier to detect the contour shape of the terminals 11, 12. In the first embodiment, inspection points to be inspected p1 to p8 (see FIG. 5) are set, on the basis of the contour shape detected by the control unit 5.

The contour shape is detectable by any of known techniques of edge detection in image processing. In the first embodiment, the edge detection may rely entirely upon the control unit 5, or may rely partly upon an operator of the inspection apparatus. The edge detection in this case may be such that the control unit 5 detects the edges of the terminals 11, 12, and presents them to the operator. The operator then may enter information for adjusting or correcting the edges, detected by the control unit 5, through an unillustrated input device into the control unit 5.

The inspection points may be set, for example, automatically by the control unit 5 according to predetermined conditions. Such processing may be accomplished typically by, as illustrated in FIG. 5, determining on the image the inspection point p0 on the edge of the terminal 12, and assuming this point as the origin, by setting pixels that are distant away from the origin by predetermined numbers of pixels in the x-direction and y-direction, as candidates for the inspection points p1 to p8. The control unit 5 may alternatively determine, from among the thus determined candidates for the inspection points p1 to p8, at least a part thereof according to a predetermined number or layout of the inspection points.

Also in such processing, a part of procedures may be left in charge of the operator. Procedures left in charge of the operator are exemplified by fine adjustment or selection of the inspection points.

(Electronic Component Inspection Method)

As can be understood from the description above, the inspection method of the first embodiment includes: irradiating the reflected light Lr on at least the terminals 11, 12 of an electronic component 1 that has a component body 10 and the terminals 11, 12, from the back face of the electronic component 1; capturing an image of the electronic component under irradiation of the reflected light Lr; and controlling processing related to inspection of the electronic component, on the basis of the captured image of the electronic component.

From among the aforementioned steps, the step of irradiating the irradiation light L and the reflected light Lr is conducted while holding and fixing the electronic component 1. Action of making the holder hold the electronic component 1 may be assisted by some device such as robot arm, or may be manually achieved by the operator.

The irradiation light L may be irradiated, for example, with the aid of the control unit 5, or a device that controls any unillustrated mechanism. Use of the control unit 5 for irradiation of the irradiation light L will, however, facilitate the first embodiment to synchronize irradiation timing of the irradiation light L and acquisition timing of image data. The irradiation light L may alternatively be irradiated manually by the operator who switches ON the light sources 31, 32 which are the light sources of laser light. The step of capturing an image of the electronic component 1 under of the irradiation light L and the reflected light Lr may be activated, when the control unit 5 outputs a control signal that notifies shooting timing towards the control unit 5. Note, however, that shooting per se may be conducted by the operator through handling of the camera 25.

Control of the processing related to inspection of the electronic component may rely upon the control unit 5, or may partly rely upon the operator as described above. The processing related to inspection of the electronic component is not limited to setting of the inspection points. Other possible processing includes inspection of in-plane deformation or variation of shape of the terminals 11, 12.

In the first embodiment, the aforementioned processing may be followed by measurement of the distance between the camera 25 and the terminals 11, 12. Height may be measured with use of a 3D camera, typically according to the time-of-flight (TOF) system. For seamless operations from the setting of the inspection points up to the measurement of height, the camera 25 is preferably the 3D camera.

The thus measured distance is then computed to determine flatness of the electronic component 1 when mounted, making it possible to judge whether the electronic component 1 is acceptable or rejected.

According to the first embodiment described above, a backlit image with sharp edges is obtainable since the reflected light Lr is irradiated on the back face of the terminals 11, 12. With the inspection points set on the basis of the backlit image, the inspection points will be more accurately set, and also the flatness will be more accurately detected as a consequence. The electronic component inspection apparatus and the electronic component inspection method of the first embodiment can therefore accurately determine the inspection points on the terminals of the electronic component.

Second Embodiment

Next, a second embodiment of the present disclosure will be explained. The inspection apparatus of the second embodiment is different from the first embodiment, in that the reflective plates 21, 22 are held at different angles between during transfer and during image capture of the electronic component 1, in contrast to the first embodiment in which the reflective plates 21, 22 were held at a fixed declined angle.

Figure 6A:
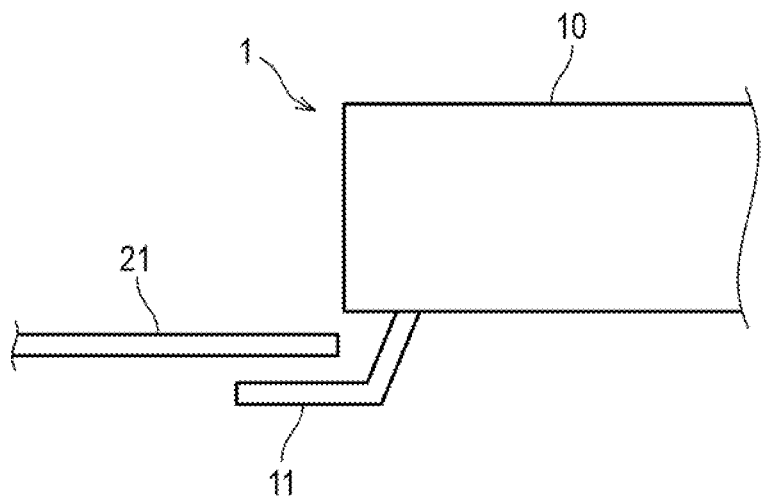
Figure 6B:
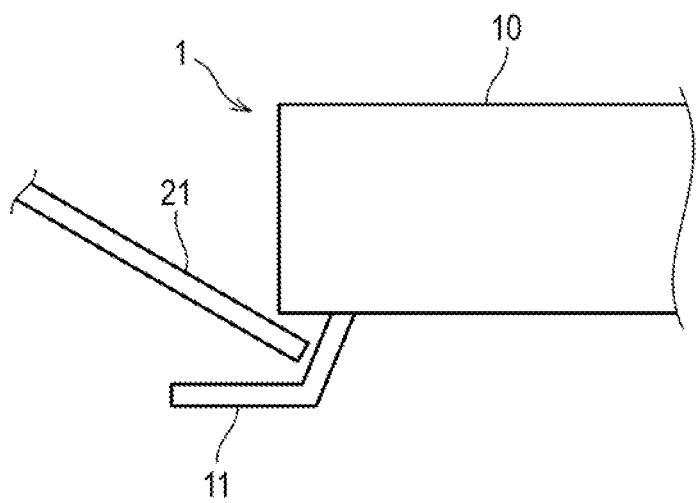

FIG. 6A and FIG. 6B are schematic drawings for explaining the inspection apparatus of the second embodiment, both illustrating a part of the terminal 11 of the electronic component 1. FIG. 6A illustrates the reflective plate 21 when the electronic component 1 is transferred, and FIG. 6B illustrates the reflective plate 21 when the electronic component 1 is shot. The electronic component 1 is transferred horizontally in the direction perpendicular to the sheet of FIG. 6A, with the aid of a transfer unit (not illustrated) such as belt conveyor equipped on the inspection apparatus.

As described previously, the camera 25 can continuously shoot a plurality of electronic components 1. The inspection apparatus of the second embodiment further has an angle changer that changes the angle at which the reflective plates 21, 22 tilt from the mounting face. The angle changer makes change so that the angle of the reflective plates relative to the mounting face, during image capture of the electronic component within the image capture area A (a predetermined tilt angle as illustrated in FIG. 6B), so as to become larger than the angle of the reflective plates relative to the mounting face, during transfer of the electronic component from the outside to the inside, or from the inside to the outside, of the image capture area A (nearly flat angle as illustrated in 6A).

In the second embodiment, the control unit 5 is specified to function as the angle changer. In this way, the second embodiment now becomes possible to easily determine timing of changing the tilt angle of the reflective plates 21, 22, upon start of transfer or shooting of the electronic component 1. Note that the timing of transfer of the electronic component 1 or its arrival at the image capture area A may be detected by counting a preset time necessary for transfer or shooting of the electronic component 1, typically on the basis of number of clocks. The timing may alternatively be detected by using a photosensor, having a light emitter and a light receiver arranged while placing the image capture area A in between, by which arrival of the electronic component 1 at the image capture area A is determined upon turning OFF of the photosensor.

In this way, the second embodiment now becomes possible to reduce a range occupied heightwise by the reflective plates 21, 22 in the overlapping area between the component body 10 and the terminal 11, upon completion of shooting of the electronic component 1 and exit from the image capture area A, and can prevent the electronic component 1, when transferred, from interfering with the reflective plate 21. On the other hand, the reflective plates 21, 22 during shooting are tilted between the component body 10 and the terminal 11. In this way, the light that was emitted from the light sources 31, 32 obliquely towards the component body 10, and was converted into the reflected light Lr after incident on the lower faces of the reflective palates 21, 22 can now illuminate the terminals 11, 12 nearly perpendicularly as illustrated in FIG. 4, making it possible to efficiently condense the reflected light Lr onto the terminals 11, 12.

This motion of the reflective plates 21, 22 may be enabled by providing an unillustrated drive unit, typically a stepping motor, that changes tilt of the reflective plates 21, 22, wherein towards a driver of the drive unit, the control unit 5 outputs a control signal that instructs the drive operation. Upon acquisition of image data of a preceding electronic component 1, the control unit 5 outputs a control signal that instructs reduction of tilt of the reflective plates 21, 22, towards the drive unit that changes the tilt of the reflective plates 21, 22. Upon detection of arrival of another succeeding electronic component 1 at the image capture area A, the control unit 5 then outputs a control signal that instructs increase of the tilt of the reflective plates 21, 22, towards the driver. After outputting the control signal, the control unit 5 instructs the camera 25 to start shooting, and acquires the image data.

According to the second embodiment, the electronic component 1, when transferred, may be prevented from interfering with the reflective plates 21, 22, so that a series of processing will not be interrupted. This advantageously prevents process efficiency of inspection of the electronic component from degrading, and reduces a risk of deformation of the terminals 11, 12 of the electronic component 1 during inspection.

Note, however, that the structure of the second embodiment, aimed to avoid interference of the terminals 11, 12 and the reflective plates 21, 22 during transfer of the electronic component 1, is not limited to those relying upon change of tilt of the reflective plates 21, 22. Next paragraphs will describe variations 1 and 2 of the second embodiment, aimed at avoiding interference between the terminals 11, 12 and the reflective plates 21, 22.

(Variation 1)

Figure 7A:
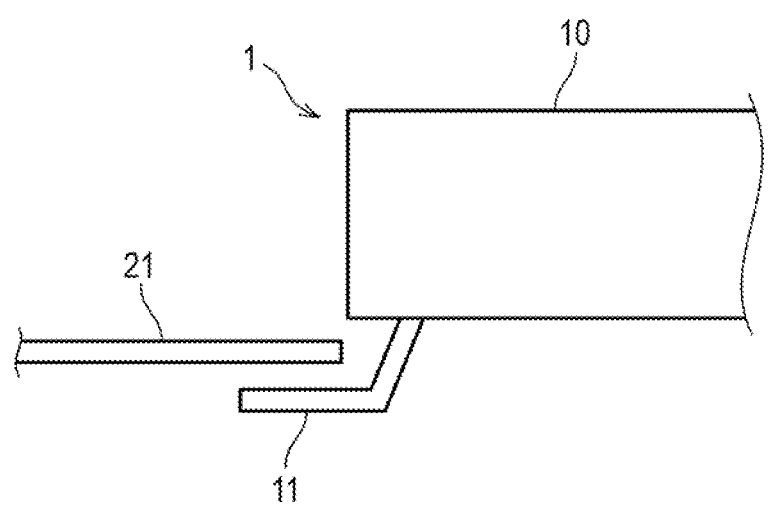
Figure 7B:
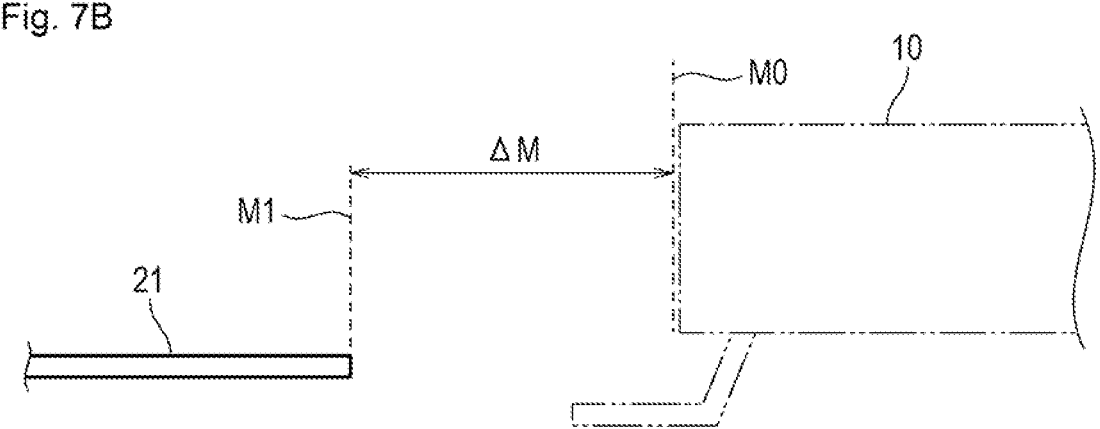

FIGS. 7A and 7B are drawings for explaining a variation 1 of the second embodiment. The inspection apparatus of the variation 1 further has a reflective plate shifter that shifts the reflective plates 21, 22 closer to or away from the electronic component 1. The reflective plate shifter shifts the reflective plates 21, 22 so that they will become distant from the electronic component 1 outwardly in the direction the terminals 11, 12 extend, more largely during transfer of the electric component 1, than during image capture of the electronic component 1. In the inspection apparatus of the variation 1, the control unit 5 functions as the reflective plate shifter. The control unit 5 shifts the reflective plates 21, 22 so as to make them closer to the electronic component 1 during image capture of the electronic component 1, and to make them more distant from the electronic component 1 after the image capture. FIG. 7A illustrates a position of the reflective plate 21 during the image capture, and FIG. 7B illustrates a position of the reflective plate 21 retracted from the electronic component 1 after the image capture.

This motion of the reflective plates 21, 22 may be enabled by providing an unillustrated drive unit, typically a stepping motor, that brings the reflective plates 21, 22 away from or closer to the electronic component 1, wherein towards a driver of the drive unit, the control unit 5 outputs a control signal that instructs the drive operation. Upon acquisition of image data of a preceding electronic component 1, the control unit 5 outputs a control signal that instructs retraction of the reflective plates 21, 22, from the position illustrated in FIG. 7A to the position illustrated in FIG. 7B, towards the drive unit of the reflective plates 21, 22.

According to the control signal, the drive unit retracts the reflective plate 21 from end point position M0 to position Ml where the reflective plate 21, when viewed from the mounting face, will not overlap the terminals 11, 12. In the variation 1, reflective plate 21 is consequently retracted by distance ΔM from position M0. In this way, the electronic component 1 is successfully prevented from interfering with the reflective plates 21, 22, when a transfer unit (not illustrated) of the inspection apparatus transfers the electronic component 1 in whichever direction from among the vertical and depth directions of FIG. 7B.

Note that the structure of the second embodiment, aimed to avoid interference of the electric component 1 and the reflective plates 21, 22, is not limited to those relying upon driving of the reflective plates 21, 22.

Figure 8:
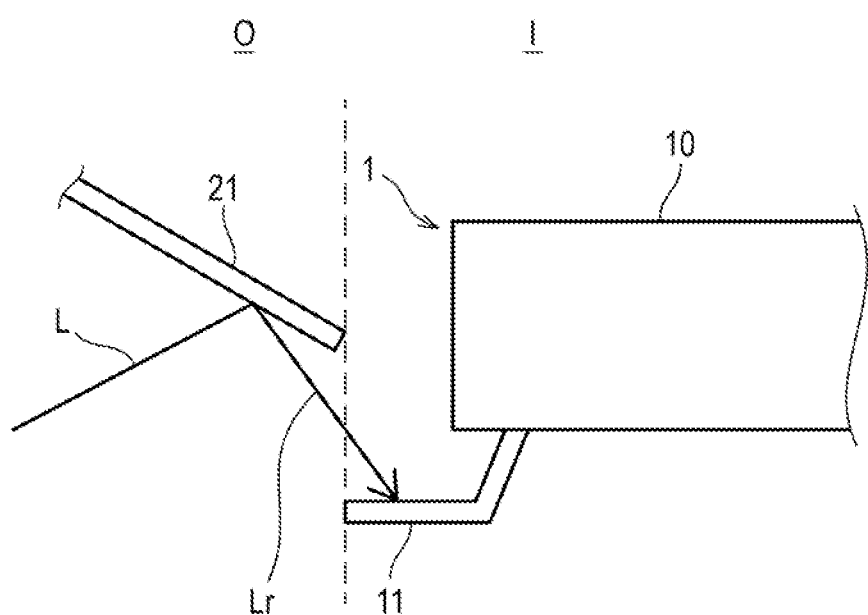
FIG. 8 is a drawing explaining an electronic component inspection apparatus according to a variation 2 of the second embodiment.

FIG. 8 a drawing for explaining the inspection apparatus of a variation 2 of the second embodiment. In the variation 2, the reflective plates 21, 22 as the reflector are fixed in an area that does not overlap the electronic component 1 when viewed from the side of the mounting face. In FIG. 8, an area that overlaps the electronic component is denoted by I, and the area that does not overlap is denoted by O.

In the variation 2, the entire ranges of the reflective plates 21, 22 including the ends are fixed within the area O. The reflective plates 21, 22 are arranged with the ends thereof obliquely declined towards the component body 10. In this way, the reflective plates 21, 22, even if being thus fixed, will no longer interfere with the electronic component 1, making it possible to reduce nonconformities such that the apparatus is interrupted during inspection of the electronic component, or such that the terminals 11, 12 of the electronic component 1 are damaged.

The aforementioned embodiments encompass the technical spirits below.

(1) An electronic component inspection apparatus that includes: a holding unit that holds an electronic component having a component body and a terminal; a photo-irradiation unit that irradiates light at least on the terminal of the electronic component held by the holding unit, from the side of a back face opposite to a mounting face of the electronic component; an image capture unit that captures an image of the electronic component under irradiation of the light, from the side of the mounting face; and a control unit that controls processing related to inspection of the electronic component, on the basis of the image of the electronic component captured by the image capture unit.

(2) The electronic component inspection apparatus according to (1), wherein the photo-irradiation unit includes: a light source that irradiates the irradiation light on the electronic component; and a reflector that reflects, from the side of the back face, the irradiation light irradiated by the light source.

(3) The electronic component inspection apparatus according to (2), wherein the terminal of the electronic component is a lead terminal that extends from the component body, a part of the lead terminal and a part of the component body are arranged apart from each other, and so as to form an overlapping area when viewed from the side of the mounting face, and the reflector is a reflective plate that is inserted into the overlapping area of the component body and the lead terminal.

(4) The electronic component inspection apparatus according to (3), further including an angle changer that changes an angle at which the reflective plate tilts from the mounting face, and the angle changer changes the angle at which the reflective plate tilts from the mounting face, so as to make the angle larger during image capture of the electronic component, than during transfer of the electronic component.

(5) The electronic component inspection apparatus according to (3), further including a reflective plate shifter that shifts the reflective plate closer to or away from the electronic component, and the reflective plate shifter shifts the reflective plate so as to make the reflective plate shifted more largely away from the electronic component during transfer of the electronic component, than during image capture of the electronic component.

(6) The electronic component inspection apparatus according to (2), wherein the reflector is fixed in an area that does not overlap the electronic component when viewed from the side of the mounting face.
(7) The electronic component inspection apparatus according to any one of (1) to (6), wherein the control unit detects at least a contour shape of the terminal on the basis of the image of the electronic component, and sets an inspection point to be inspected on the basis of the detected contour shape.
(8) An electronic component inspection method that includes: irradiating light on at least a terminal of an electronic component that has a component body and the terminal, from the side of a back face opposite to a mounting face of the electronic component; capturing an image of the electronic component under irradiation of light, from the side of the mounting face; and controlling processing related to inspection of the electronic component, on the basis of the captured image of the electronic component.

What is claimed is:

1. An electronic component inspection apparatus comprising:
    a holder configured to hold an electronic component, the electronic component being configured with a component body and a terminal;
    a light source configured to irradiate light on the electronic component;
    a reflector receiving the light from the light source from a side of a back face of the terminal to reflect the light toward a top surface of the terminal;
    a camera disposed to face the terminal and a bottom surface of the component body, the camera being configured to capture an image of the bottom surface of the component body and bottom surface of the terminal while the light is reflected by the reflector; and
    a control unit configured to perform inspection processing of the electronic component based on the captured image,
    wherein the terminal of the electronic component is a lead terminal that extends from the component body,
    a part of the lead terminal and a part of the component body are spaced apart from each other and forms an overlapping area when viewed from a side of the bottom surface of the component body, and
    the reflector is a reflective plate that is inserted into the overlapping area of the component body and the lead terminal.

2. The electronic component inspection apparatus according to claim 1, further comprising an angle changer configured to change an angle at which the reflective plate tilts from the bottom surface of the terminal,
    wherein the angle changer is configured to change the angle to be larger during image capture of the electronic component via the camera than during transfer of the electronic component.

3. The electronic component inspection apparatus according to claim 1, further comprising a reflective plate shifter configured to shift the reflective plate closer to or away from the electronic component,
    wherein the reflective plate shifter is configured to shift the reflective plate to be more largely away from the electronic component during transfer of the electronic component than during image capture of the electronic component via the camera.

4. The electronic component inspection apparatus according to claim 1,
    wherein the control unit is configured to detect at least a contour shape of the term based on the captured image of the electronic component and set an inspection point to be inspected based on the detected contour shape of the terminal.

5. An electronic component inspection method comprising:
    holding an electronic component, the electronic component being configured with a component body and a terminal;
    irradiate light on the electronic component from a side of a back face of the terminal;
    reflecting, by a reflector, the light toward a top surface of the terminal;
    capturing an image of a bottom surface of the component body and a bottom surface of the terminal while the light is reflected by the reflector; and
    performing inspection processing of the electronic component based on the captured image,
    wherein the terminal of the electronic component is a lead terminal that extends from the component body,
    a part of the lead terminal and a part of the component body are spaced apart from each other and forms an overlapping area when viewed from a side of the bottom surface of the component body, and
    the reflector is a reflective plate that is inserted into the overlapping area of the component body and the lead terminal.

6. The electronic component inspection apparatus according to claim 1,
    wherein the reflective plate is inclined toward the bottom surface of the terminal as the reflective plate approaches the electronic component.

7. The electronic component inspection apparatus according to claim 1,
    wherein the component body has a top surface extending along the bottom surface of the component body, and the component body has a side surface extending from an end of the bottom surface of the component body to an end of the top surface of the component body,
    the terminal extends from the bottom surface of the component body away from the top surface and bends along the bottom surface of the component body at an intermediate part of the terminal, and
    the reflector is aligned with one of the side surface of the component body or the terminal along an extending direction of the bottom surface of the component body.

8. The electronic component inspection method according to claim 5,
    wherein the reflective plate is inclined toward the bottom surface of the terminal as the reflective plate approaches the electronic component.

9. The electronic component inspection method according to claim 5,
    wherein the component body has a top surface extending along the bottom surface of the component body, and the component body has a side surface extending from an end of the bottom surface of the component body to an end of the top surface of the component body,
    the terminal extends from the bottom surface of the component body away from the top surface and bends along the bottom surface of the component body at an intermediate part of the terminal, and
    the reflector is aligned with one of the side surface of the component body or the terminal along an extending direction of the bottom surface of the component body.

* * * * *